United States Patent [19]
Mochizuki

[11] Patent Number: 5,521,776
[45] Date of Patent: May 28, 1996

[54] MAGNETIC DISK DRIVE WITH DUST CLEANING FUNCTION

[75] Inventor: Masanobu Mochizuki, Ibaragi, Japan

[73] Assignee: NEC Corporation, Tokyo, Japan

[21] Appl. No.: 352,706

[22] Filed: Dec. 5, 1994

[30] Foreign Application Priority Data

Dec. 14, 1993 [JP] Japan .................................. 5-312433

[51] Int. Cl.$^6$ .................................................. G11B 33/14
[52] U.S. Cl. ................................ 360/97.02; 360/97.03
[58] Field of Search ............................ 360/97.02, 97.03, 360/137

[56] References Cited

U.S. PATENT DOCUMENTS

| Re. 34,497 | 1/1994 | Blanks | 360/97.02 |
| 4,249,221 | 2/1981 | Cox et al. | 360/97.02 |
| 5,150,267 | 9/1992 | Reinisch | 360/97.02 |

OTHER PUBLICATIONS

IBM Technical Disclosure Bulletin, vol. 33 No. 5, Oct. 1990, pp. 318, 319.

Primary Examiner—A. J. Heinz
Assistant Examiner—Adriana Giordana
Attorney, Agent, or Firm—Whitham, Curtis, Whitham & McGinn

[57] ABSTRACT

A magnetic disk drive with a dust cleaning function according to the present invention, in a sealed case having a cover member and a base member, includes a magnetic head positioner which has a shaft anchored at one side into the base member, an arm holder rotatably supported around the shaft by bearings and carrying a plurality of magnetic heads, and an air filter anchored at the side of the arm holder near the free end of the shaft, for filtering dust which is generated by the rotation of the bearings. Another magnetic disk drive with a dust cleaning function includes a magnetic head positioner which has a shaft rotatably supported by bearings held to the base member, an arm holder anchored to the shaft, furnished with an airhole at its side near the free end of the shaft, and carrying a plurality of magnetic heads, and an air filter anchored so as to cover the airhole of the arm holder, for filtering dust which is generated by the rotation of the bearings. Still another magnetic disk drive with a dust cleaning function is provided with a projection having a slanted side on either or both the cover and base members, near and opposing the arm holder on which the air filter is anchored, for directing the air flow generated with the high speed rotation of the magnetic disks.

16 Claims, 9 Drawing Sheets

MAGNETIC DISK DRIVE WITH DUST CLEANING FUNCTION

BACKGROUND OF THE INVENTION

1. Field of the Invention

The present invention relates to a magnetic disk drive used in data processors and the like, and specifically it relates to a magnetic disk drive with a dust cleaning function capable of reducing the amount of dust which is generated by the bearings of the magnetic head positioner and scattered in the sealed case.

2. Description of the Related Art

An explanation will first be given regarding a conventional magnetic disk drive, with reference to FIGS. 1 and 2.

Referring to FIG. 1, a conventional magnetic head positioner 100 has a shaft 103 anchored at one end into a base member 102, a plurality of bearings 104 anchored around the shaft 103, an arm holder 105 anchored around the bearings 104 and held in a rotatable manner around the shaft 103, and a head arm 106 fittedly anchored in the arm holder 105 and capable of carrying a plurality of magnetic heads.

Referring to FIG. 2, a conventional magnetic disk drive includes, in a sealed head disk assembly (hereinafter called a sealed HDA) having a cover member 101 and a base member 102, the magnetic head positioner 100 shown in FIG. 1 carrying a plurality of magnetic heads 107, a spindle motor 109 carrying a plurality of magnetic disks 108, and a voice coil motor 110 for rocking the magnetic head positioner 100. In addition, there is mounted under the base member 102 an electronic circuit board 111 for electrical control of the magnetic head positioner 100, the spindle motor 109 and the voice coil motor 110.

However, this conventional magnetic disk drive has some disadvantages, which are explained below.

In recent years, magnetic disk drives have come into more widespread use as external storages for data processors. Also, in order to achieve greater processing speeds for the magnetic disk drives themselves, the positioning speed of magnetic head positioners are also becoming faster. As a result, the rotational speed of the bearings is increased, leading to a greater number of dust particles generated by wear of the bearings themselves, and therefore a great amount of dust is scattered in the sealed case. For example, when this dust infiltrates into the minute spaces between the magnetic disks and the magnetic heads, physical damage is incurred on the magnetic disks and the magnetic heads, eventually rendering impossible the proper reading and writing of data in the magnetic disk drive.

SUMMARY OF THE INVENTION

The main object of the present invention is to overcome the disadvantages described above by providing a magnetic disk drive with a dust cleaning function capable of reducing the number of dust particles generated by the bearings of the magnetic head positioner rotating at high speed and scattered in the sealed case, and thus of improving the reliability of the magnetic disk drive as a whole.

According to the present invention, a magnetic disk drive with a dust cleaning function, in a sealed case having a cover member and a base member, includes a magnetic head positioner which has a shaft anchored at one side into the base member, an arm holder rotatably supported around the shaft by bearings and carrying a plurality of magnetic heads, and an air filter anchored at the side of the arm holder near the free end of the shaft, for filtering dust which is generated by the rotation of the bearings.

According to the present invention, another magnetic disk drive with a dust cleaning function, in a sealed case having a cover member and a base member, includes a magnetic head positioner which has a shaft rotatably supported by bearings held to the base member, an arm holder anchored to the shaft, furnished with an airhole at its side near the free end of the shaft, and carrying a plurality of magnetic heads, and an air filter anchored so as to cover the airhole of the arm holder, for filtering dust which is generated by the rotation of the bearings.

According to the present invention, still another magnetic disk drive with a dust cleaning function in a sealed case having a cover member and a base member is provided with a projection having a slanted side on either or both the cover and base members, near and opposing the arm holder on which the air filter is anchored, for directing the air flow generated with the high speed rotation of the magnetic disks.

BRIEF DESCRIPTION OF THE DRAWINGS

The features and advantages of the present invention will become apparent from the following description when taken in conjunction with the accompanying drawings in which.

Identical reference numbers in the drawings indicate the same constituent elements.

DETAILED DESCRIPTION OF THE PREFERRED EMBODIMENTS

The embodiments of the present invention will now be explained in detail with reference to the drawings.

Figure 1:
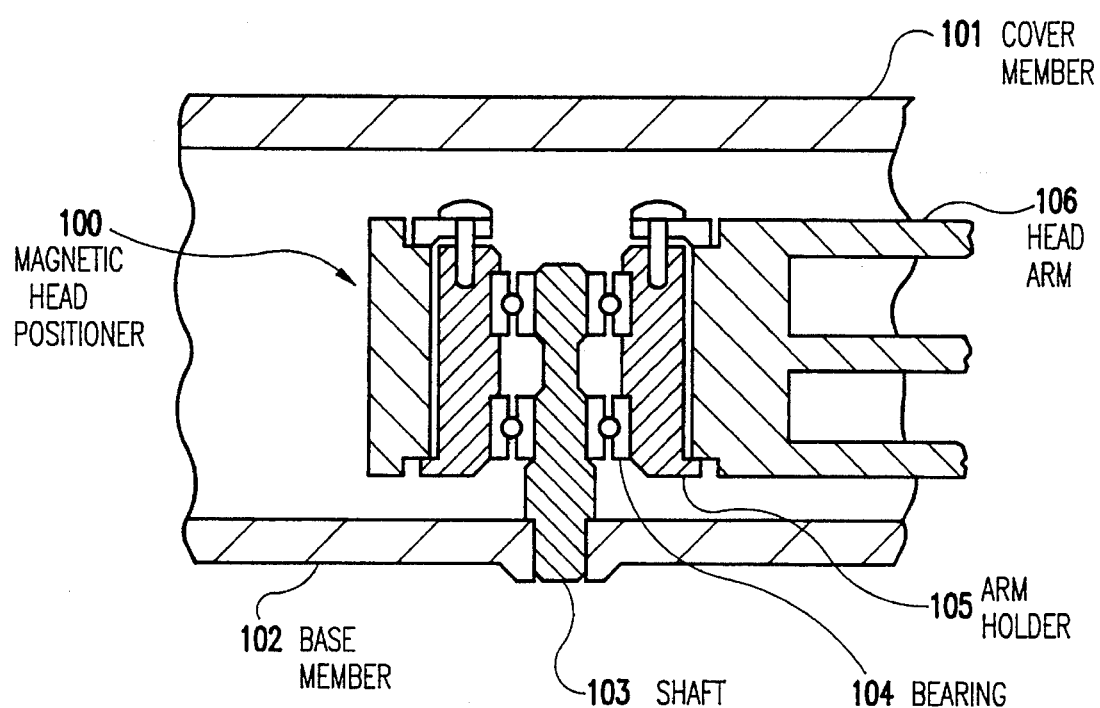
FIG. 1 is a sectional view of a conventional magnetic head positioner.
Figure 2:
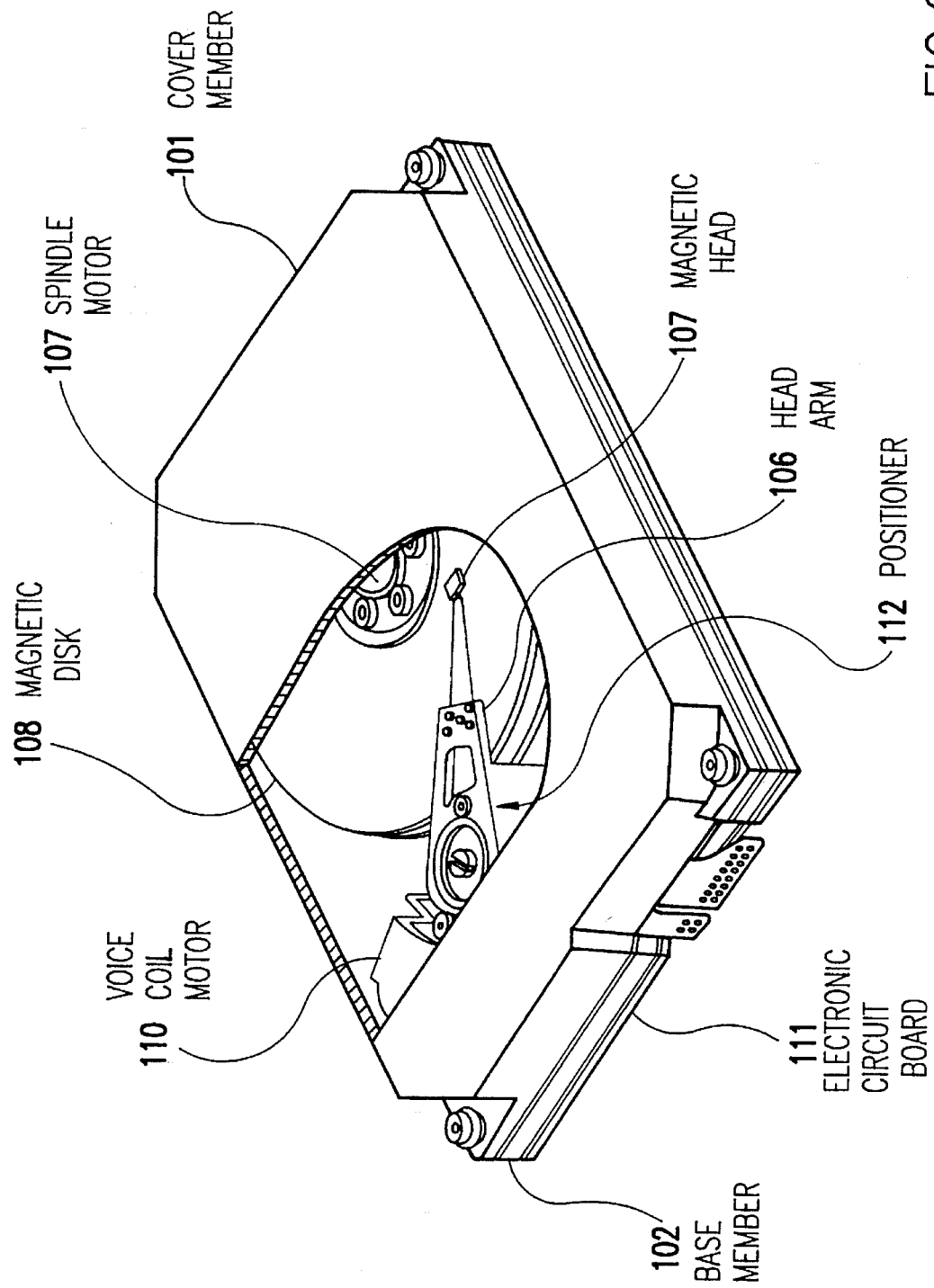
FIG. 2 is a perspective view of a conventional magnetic disk drive.
Figure 3:
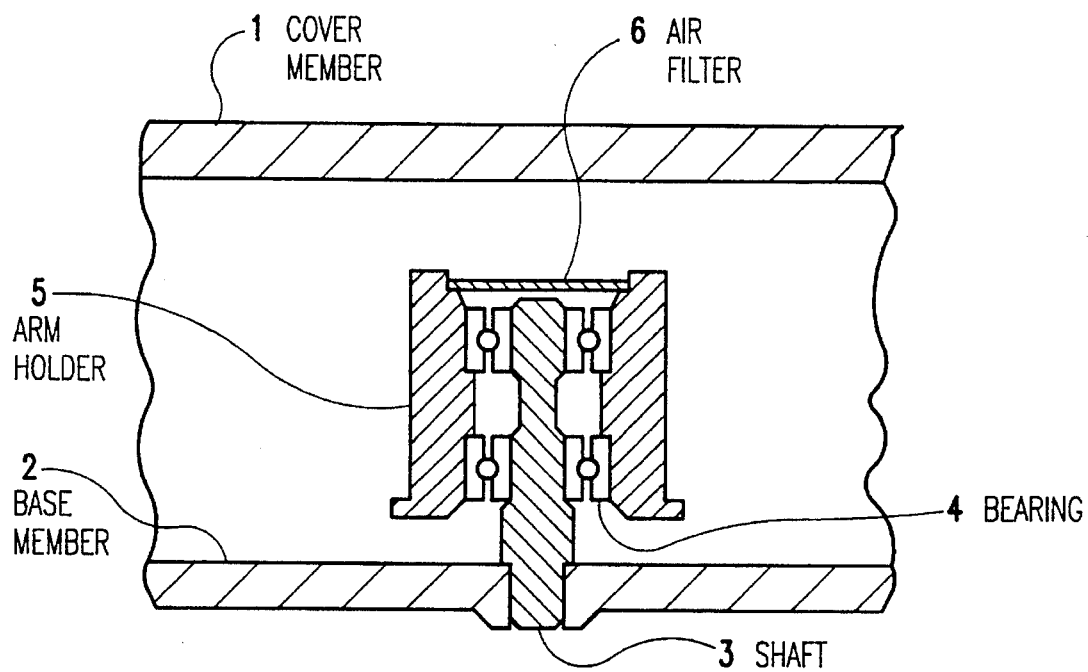
FIG. 3 is a sectional view of a first embodiment of the present invention.

Referring to FIG. 3, the first embodiment of the present invention includes, in a sealed head disk assembly (hereinafter called a sealed HDA) having a cover member 1 and a base member 2, a magnetic head positioner comprising a shaft 3 anchored at one end into the base member 2, an arm holder 5 supported in a rotatable manner around the shaft 3 via a plurality of bearings 4 and capable of carrying a plurality of magnetic heads, and an air filter 6 anchored at the side of the arm holder 5 near the free end of the shaft, for filtering dust which is generated by the bearings 4. This magnetic head positioner is a fixed-shaft type.

Figure 4:
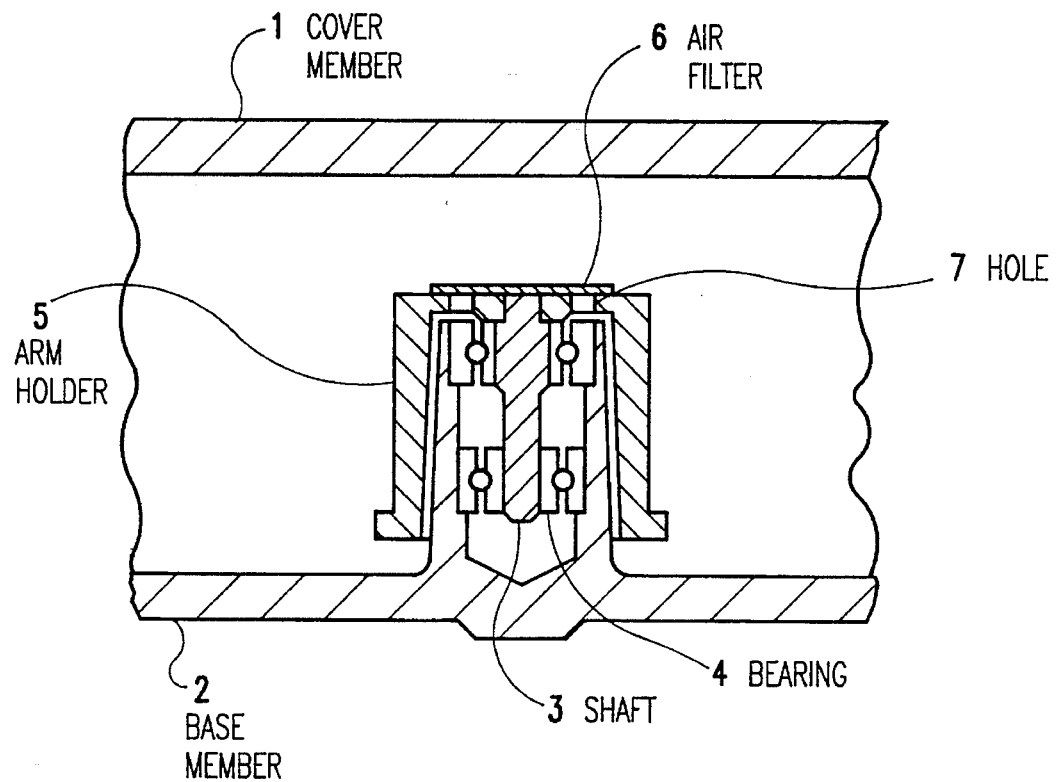
FIG. 4 is a sectional view of a second embodiment of the present invention.

Referring to FIG. 4, the second embodiment of the present invention includes, in a sealed HDA comprising a cover member 1 and a base member 2, a magnetic head positioner comprising a shaft 3 supported in a rotatable manner to a protrusion from the base member 2 via a plurality of bearings 4, an arm holder 5 anchored to and supported in a rotatable manner around the shaft 3, furnished with an airhole 7 at its side near the free end of the shaft, and capable of carrying a plurality of magnetic heads, and an air filter 6 anchored so as to cover the airhole 7 of the arm holder 5, for filtering dust which is generated by the bearings 4. This magnetic head positioner is a rotating shaft type.

Figure 5:
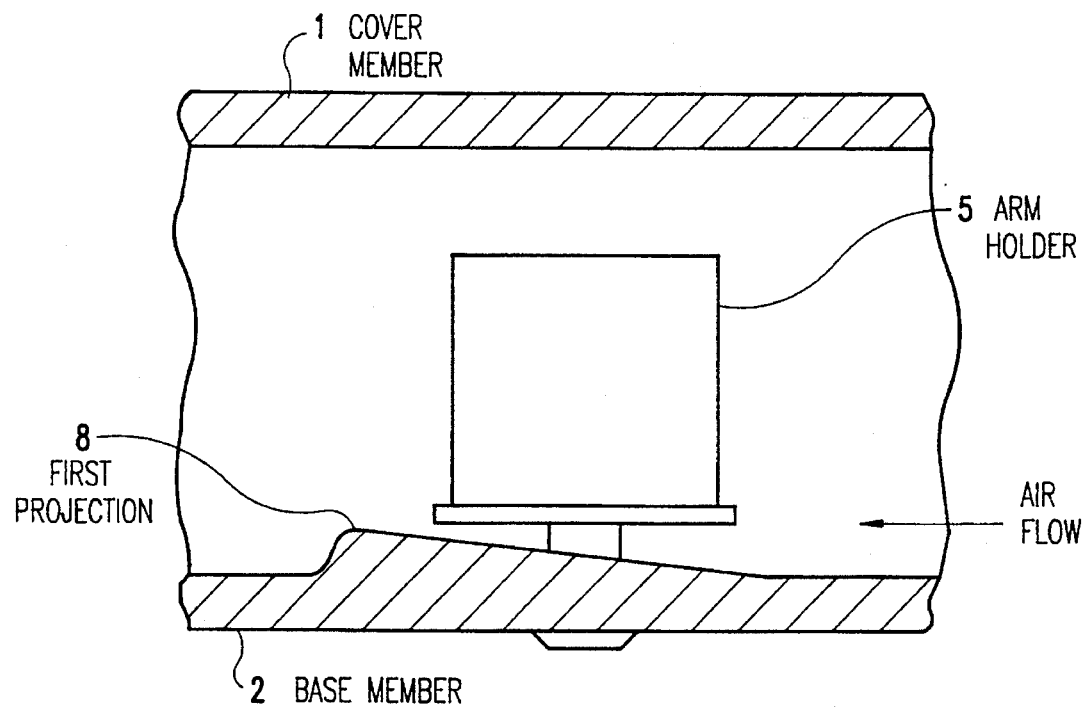
FIG. 5 is a sectional view of a third embodiment of the present invention.

Referring to FIG. 5, the third embodiment of the present invention is provided with a first projection 8 with a slanted side on the base member 2 near and opposing the bottom of the arm holder 5 of the magnetic head positioner. This first projection 8 is constructed to direct the air flow generated in the space between the base member 2 and the arm holder 5 by the high-speed rotation of the magnetic disk in the sealed HDA, and it has a slanted side which gradually lowers toward the upstream end from the downstream end of the air flow. The magnetic head positioner used in this case may be either the fixed-shaft type shown in FIG. 3 or the rotating shaft type shown in FIG. 4.

Figure 6:
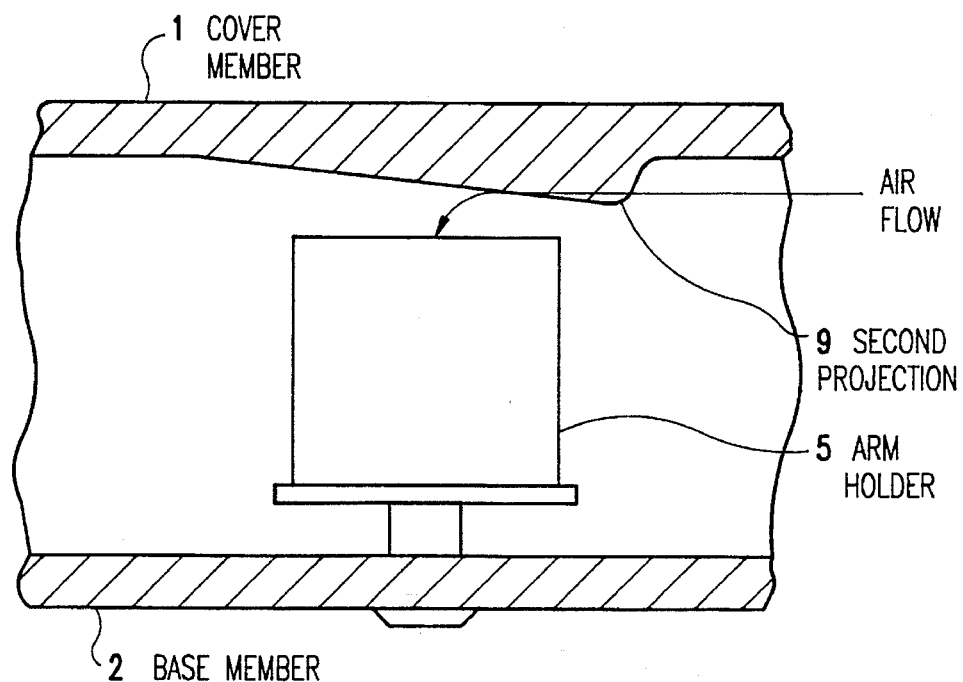
FIG. 6 is a sectional view of a fourth embodiment of the present invention.

Referring to FIG. 6, the fourth embodiment of the present invention is provided with a second projection 9 with a slanted side on the cover member 1 near and opposing the top of the arm holder 5 of the magnetic head positioner. This second projection 9 is constructed to direct the air flow generated in the space between the cover member 1 and the arm holder 5 by the high-speed rotation of the magnetic disk in the sealed HDA, and it has a slanted side which gradually lowers toward the downstream end from the upstream end of the air flow. The magnetic head positioner used in this case may be either the fixed-shaft type shown in FIG. 3 or the rotating shaft type shown in FIG. 4.

Figure 7:
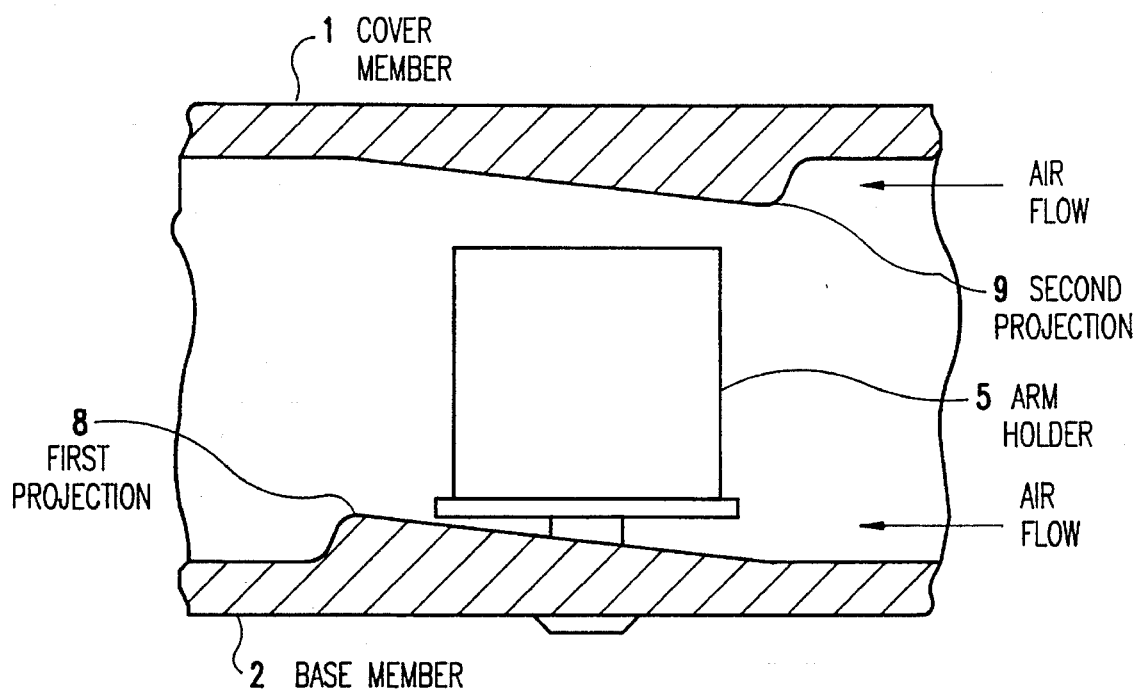
FIG. 7 is a sectional view of a fifth embodiment of the present invention.

Referring to FIG. 7, the fifth embodiment of the present invention is provided with both a first projection 8 with a slanted side on the base member 2 near and opposing the bottom of the arm holder 5 of the magnetic head positioner, and a second projection 9 with a slanted side on the cover member near and opposing the top of the arm holder 5. The first projection 8 is constructed to direct the air flow generated in the space between the base member 2 and the arm holder 5 by the high-speed rotation of the magnetic disk in the sealed HDA, and it has a slanted side which gradually lowers toward the upstream end from the downstream end of the air flow. The second projection 9 is constructed to direct the air flow generated in the space between the cover member 1 and the arm holder 5 by the high-speed rotation of the magnetic disk in the sealed HDA, and it has a slanted side which gradually lowers toward the downstream end from the upstream end of the air flow. The magnetic head positioner used in this case may be either the fixed-shaft type shown in FIG. 3 or the rotating shaft type shown in FIG. 4.

Figure 8:
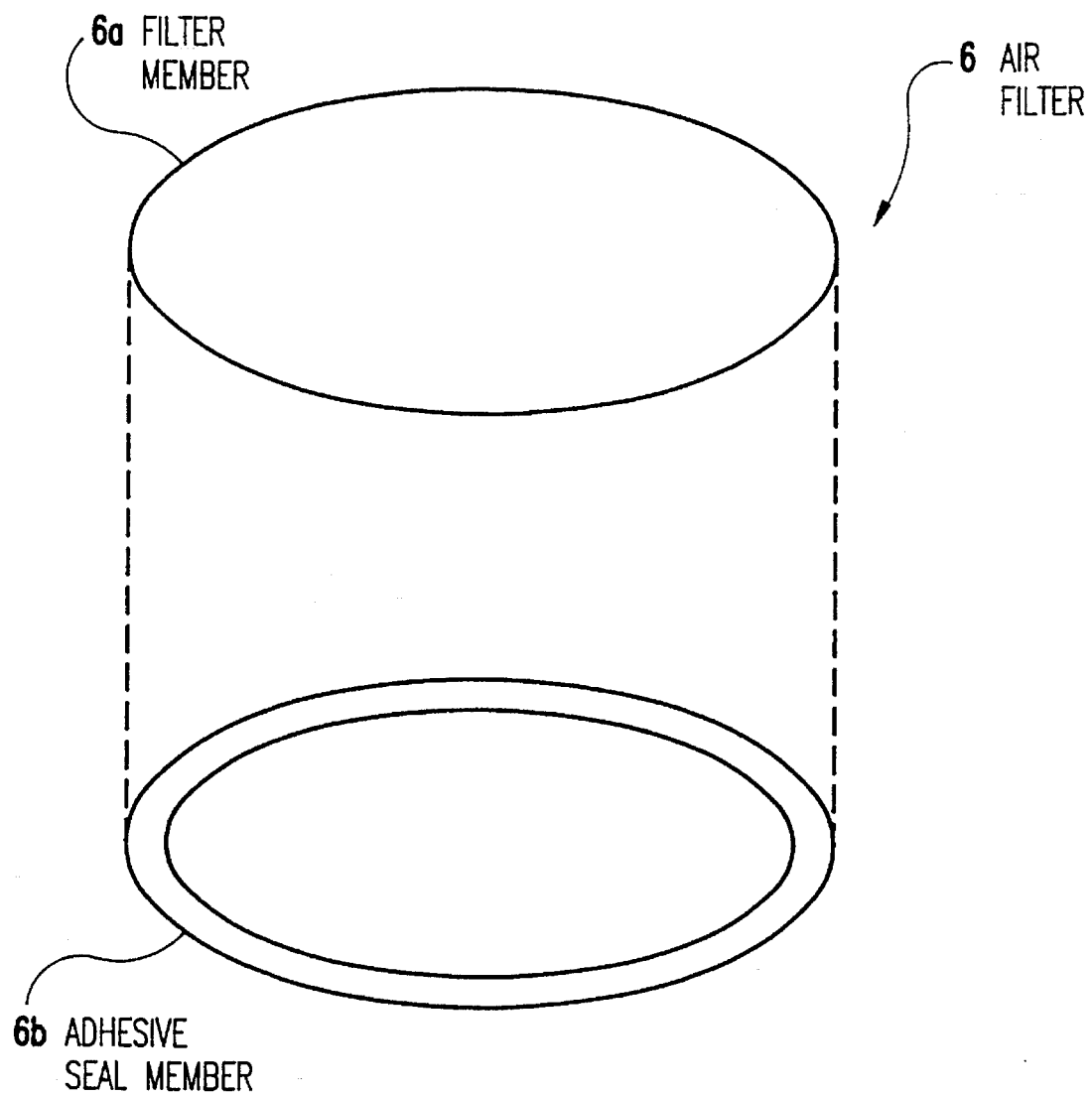
FIG. 8 is an illustration showing the construction of an air filter to be used in the present invention.

Referring to FIG. 8, the air filter 6 used according to the present invention comprises a filter member 6a and an adhesive seal member 6b. For example, as the filter member 6a there may be used a membrane filter composed of a porous film, an electric filter formed by rolling and polarizing a polymer sheet, or a glass fiber filter made of carded glass fibers with pasting protective paper on both sides thereof. The adhesive seal member 6b is formed into a hollow disk and coated on both sides with an adhesive.

Figure 9:
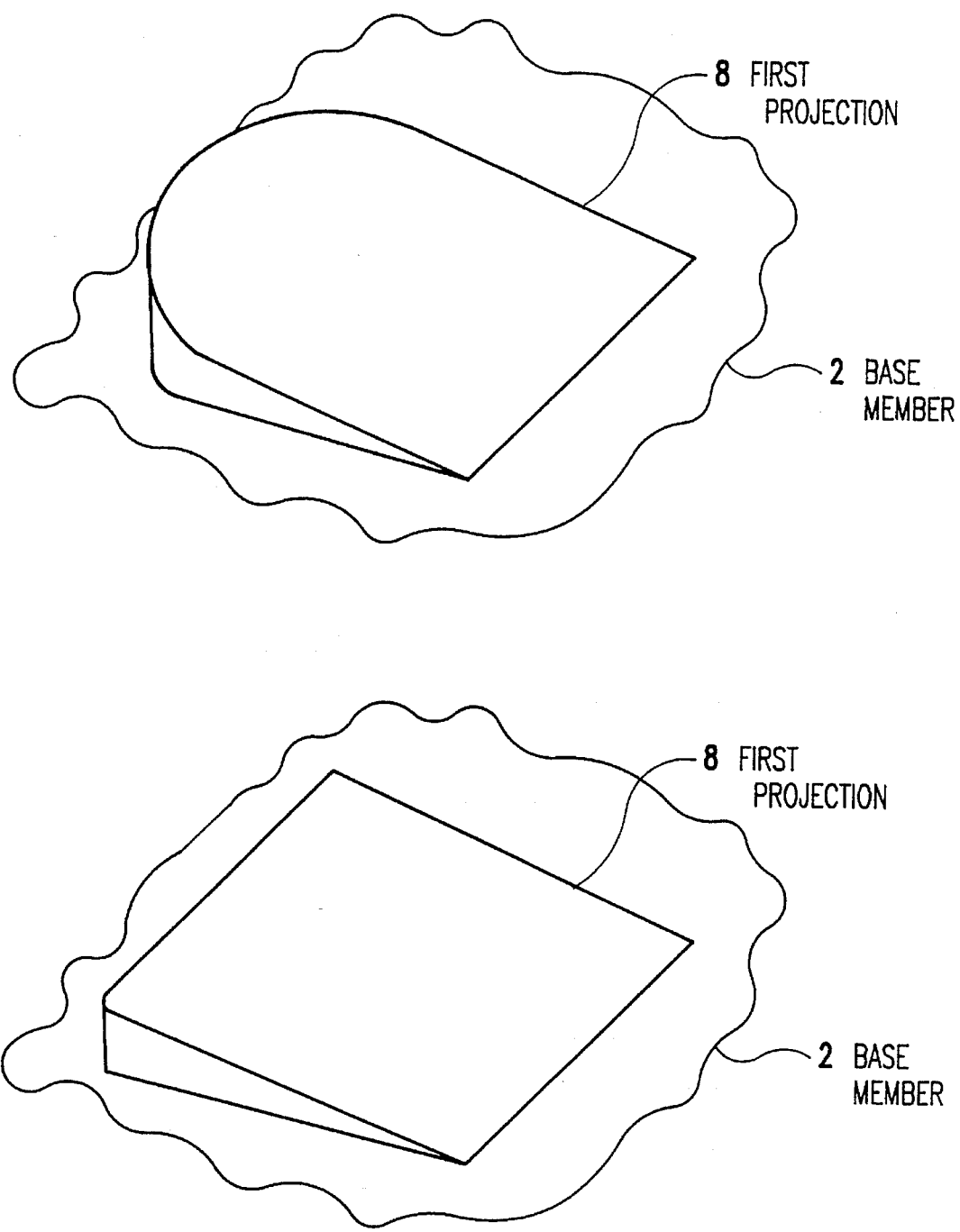
FIG. 9 is an illustration showing the shape of a first projection 8 and a second projection 9 according to the present invention.

Referring to FIG. 9, the first projection 8 and/or second projection 9 according to the present invention are either arched or rectangular at the back edge of the slanted side. In addition, the height of the slanted side is set to be as high as possible without contacting the arm holder 5. Furthermore, the length of the slanted side is set to be slightly larger than the diameter of the arm holder 5.

Figure 10:
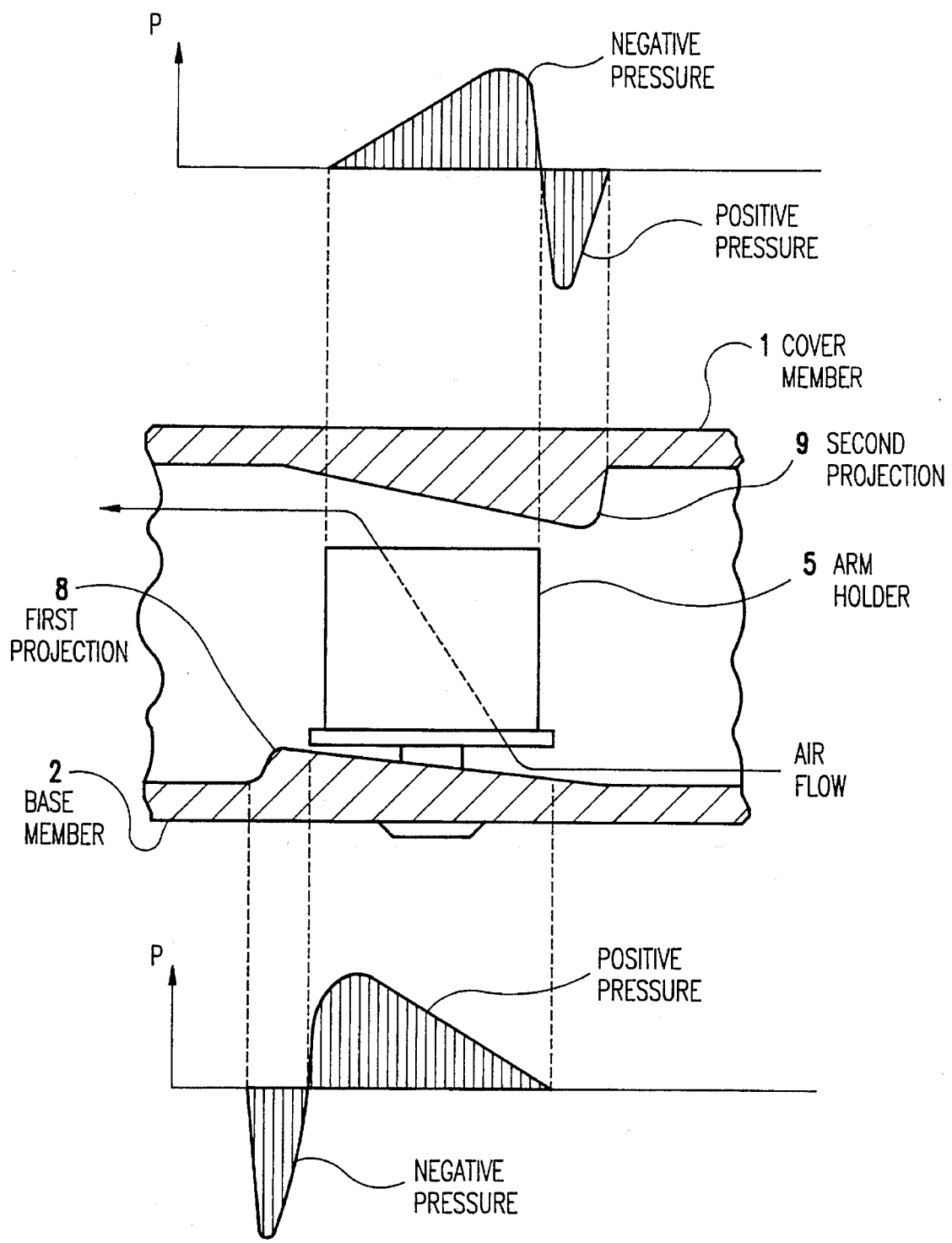
FIG. 10 is an illustration showing pressure distribution and air flow around the first projection 8 and second projection 9 of the present invention.

An explanation will now be given regarding the pressure distribution and air flow around the first projection 8 and second projection 9 of the present invention, while referring to FIG. 10.

Supposing a case in which 4 3.5-inch magnetic disks are mounted, if the magnetic disk rotates at about 3,600 rpm, and the height of the slanted sides of the first projection 8 and second projection 9 is about 2 mm, then there are generated a positive pressure of about 5–10 mm $H_2O$ and a negative pressure of about 3–6 mm $H_2O$. In this case, the pressure gradient produces an air flow from the positive pressure region toward the negative pressure region. As a result, dust generated by the bearings of the magnetic head positioner rotating at high speed is entrained in this air flow and transported to the air filter 6 anchored to the side of the arm holder 5 near the free end of the shaft, where it is filtered.

Figure 11:
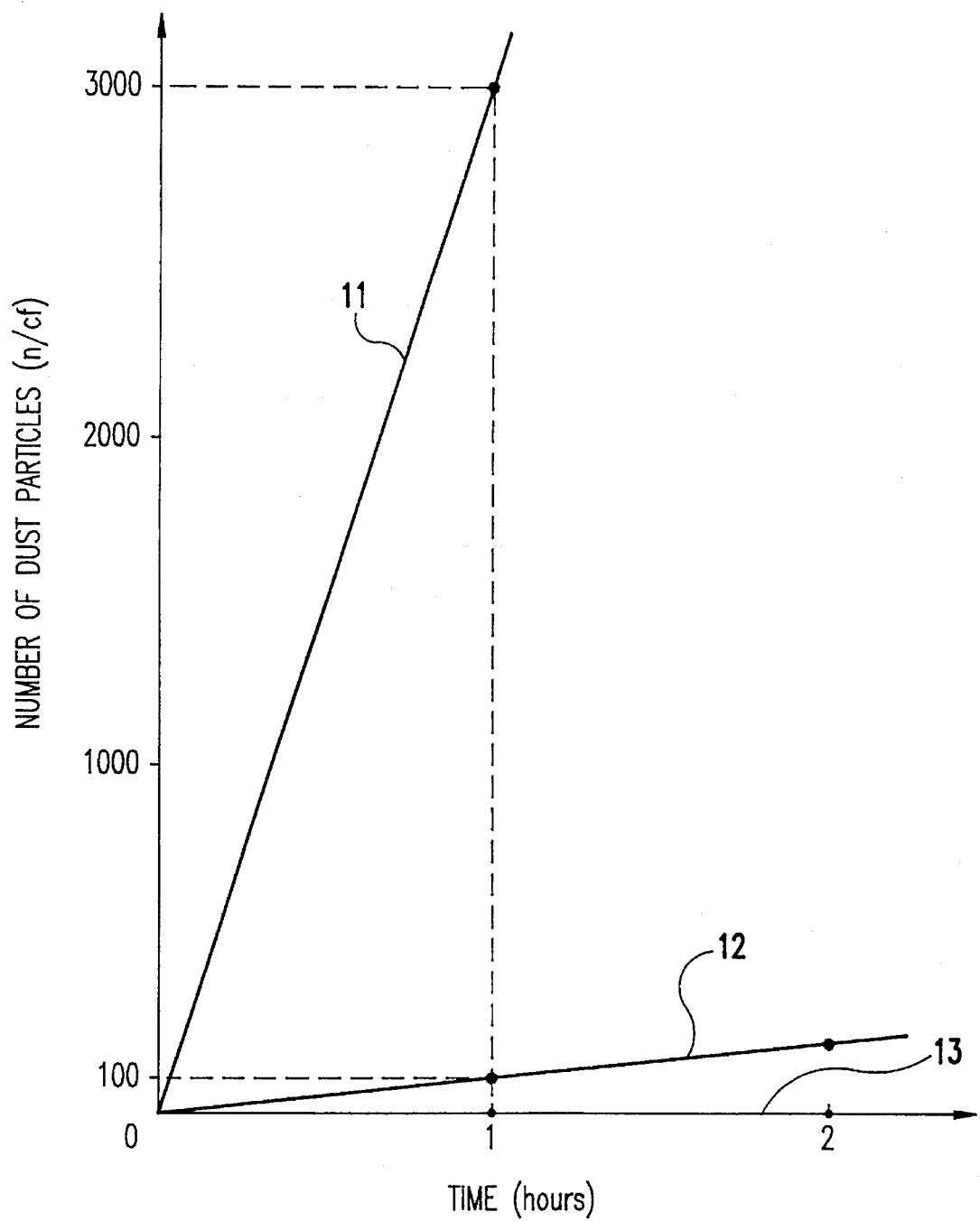
FIG. 11 is a graph showing the number of dust particles 0.1 μm or greater in size which are present per 1 cf (cubic foot).

An explanation will now be given in regard to the amount of dust scattered in the sealed case when the magnetic head positioner in the magnetic disk drive of the present invention is rocked, using FIG. 11 as reference. Here, the vertical axis in FIG. 11 indicates the number of dust particles 0.1 µm or greater in size which are present in 1 cf (cubic foot), and the horizontal axis indicates the measuring time.

The line 11 shows the number of dust particles in a sealed case upon rocking of a conventional magnetic head positioner, wherein an average of about 3,000 dust particles were detected per hour. In contrast, the line 12 shows the number of dust particles in a sealed case upon rocking of a magnetic head positioner according to the first or second embodiment described above, wherein an average of about 100 dust particles were detected per hour. In addition, the line 13 shows the number of dust particles in a sealed case upon rocking of a magnetic head positioner according to the fifth embodiment described above, wherein an average of about 0.1 dust particle was detected per hour.

As mentioned above, the magnetic disk drive according to the present invention makes it possible to reduce the number of dust particles generated by the bearings rotating at high speed and scattered in a sealed case, as compared with the prior art, by housing, in a sealed case which comprises a cover member and a base member, a magnetic head positioner with an air filter anchored on the side of the arm holder near the free end of the shaft, which arm holder is held in a freely rotatable manner via a plurality of bearings. As a result, damage to the magnetic disks and magnetic heads is prevented, while the reliability of the magnetic disk drive as a whole is improved.

In addition, the magnetic disk drive according to the present invention makes it possible to considerably reduce the number of dust particles generated by the bearings rotating at high speed and scattered in a sealed case, as compared with the prior art, by housing, in the sealed case which comprises a cover member and a base member, a magnetic head positioner with an air filter anchored on the side of the arm holder near the free end of the shaft, which arm holder is supported in a freely rotatable manner via a plurality of bearings, while also being provided with a projection with a slanted side on either or both the cover and base members, near and opposing the arm holder. As a result, the reliability of the magnetic disk drive as a whole may be vastly improved.

While the present invention has been described in conjunction with the preferred embodiments thereof, it will now be readily possible for those skilled in the art to put this invention into practice in various other manners.

What is claimed is:

1. A magnetic disk drive, comprising:

a base member having first and second surfaces;

a holder for supporting an arm supporting a magnetic head, said holder having a first end, a second end, a cavity extending between said first and second ends, and first and second apertures opening to said cavity at said first and second ends, respectively;

supporting means, coupled to said first surface of said base member, for supporting said holder rotatably about an axis substantially perpendicular to said base member, said supporting means including a shaft coupled to said base member and a bearing coupled to said shaft and being received in said cavity of said holder through said second aperture;

a filter, attached to said holder and closing said first aperture of said holder, for filtering a contaminant generated by said bearing; and a cover member having first and second surfaces, wherein said holder, said supporting means, and said filter are enclosed between said first surface of said base member and said second surface of said cover member.

2. A magnetic disk drive according to claim 1, wherein said filter is positioned in an inner periphery of said first aperture.

3. A magnetic disk drive according to claim 1, wherein said filter is attached over said first end so as to close said first aperture of said holder.

4. A magnetic disk drive according to claim 1, further including means for directing an air flow from said second aperture of said holder to said filter such that particulates within said holder are conveyed to and trapped by said filter.

5. A magnetic disk drive according to claim 1, wherein said shaft has an end fixed to said base member, and wherein said bearing receives said shaft and is received by said cavity of said holder, said bearing supporting said holder swingably about said shaft.

6. A magnetic disk drive according to claim 1, wherein said shaft is received in said cavity of said holder and has an end coupled to said holder, said supporting means further comprising:

a cylindrical member having an end connected to said base member and an opening receiving said shaft, wherein said bearing receives said shaft and is received by said cylindrical member, said bearing supporting said holder swingably about said shaft.

7. A magnetic disk drive according to claim 1, wherein said filter comprises a filter member and an adhesive member having a ring-shape, and said filter member is attached to said holder via said adhesive member.

8. A magnetic disk drive according to claim 1, further comprising:

means for directing an air flow from said second aperture of said holder to said filter.

9. A magnetic disk drive according to claim 8, wherein said means for directing an air flow includes a sloped portion provided on said first surface of said base member and ascending in a direction of said air flow.

10. A magnetic disk drive according to claim 9, wherein said sloped portion and said cover member form an air passage therebetween, and said air passage has a width decreasing in said direction of said air flow.

11. A magnetic disk drive according to claim 8, wherein said means for directing an air flow includes a sloped portion provided on said second surface of said cover member and descending in a direction of said air flow.

12. A magnetic disk drive according to claim 11, wherein said sloped portion and said base member form an air passage therebetween, and said air passage has a width increasing along a direction of said air flow.

13. A magnetic disk drive according to claim 8, wherein said means for directing an air flow includes first and second sloped portions.

14. A magnetic disk drive according to claim 13, wherein said first and second sloped portions form an air passage therebetween, and said air passage directs said air flow from said first aperture of said holder to said filter.

15. A magnetic disk drive according to claim 13, wherein said first sloped portion is provided on said first surface of said base member and ascends in a direction of said air flow.

16. A magnetic disk drive according to claim 15, wherein said second sloped portion is provided on said second surface of said cover member and descends in a direction of said air flow.

* * * * *